United States Patent [19]
Lawrence

[11] 3,836,903
[45] Sept. 17, 1974

[54] DISPLAY BLANKING CIRCUIT

[75] Inventor: Thomas Russell Lawrence, Omaha, Nebr.

[73] Assignee: Bell Telephone Laboratories, Incorporated, Murray Hill, N.J.

[22] Filed: Dec. 22, 1972

[21] Appl. No.: 317,728

[52] U.S. Cl. ............................ 340/336, 340/166 R
[51] Int. Cl. .............................................. G09f 9/32
[58] Field of Search ............ 340/324 R, 336, 166 R; 235/92 EA; 328/114, 118

[56] References Cited
UNITED STATES PATENTS

| | | | |
|---|---|---|---|
| 3,395,268 | 7/1968 | Barton | 235/92 EA |
| 3,400,388 | 9/1968 | Blank | 235/92 EA |
| 3,621,391 | 11/1971 | Miller | 235/92 EA |
| 3,665,327 | 5/1972 | Prentky et al. | 328/114 |

Primary Examiner—John W. Caldwell
Assistant Examiner—Marshall M. Curtis
Attorney, Agent, or Firm—Roy C. Lipton

[57] ABSTRACT

A representation of the phase difference between two digital signals is gated to, and displayed on, a plurality of indicator elements. The gating circuitry is enabled when both signals contain transitions having a sufficiently steep slope to define signals digital in nature and when the signal transitions arrive in the proper sequence. At all other times the gating circuitry is disabled so as to blank the display, whereby only representations of the phase difference between valid digital input signals are displayed.

4 Claims, 3 Drawing Figures

DISPLAY BLANKING CIRCUIT

FIELD OF THE INVENTION

This invention relates to display systems and, more particularly, to display systems which monitor and process input signals so as to display meaningful information.

DESCRIPTION OF THE PRIOR ART

Various measuring devices and information processing systems often display their output information on indicator elements such as NIXIE tubes or matrices of light emitting diodes arranged in appropriate configurations. The displayed information normally defines a relationship derived from input information being presented to the device or system. It is conceivable that this input information could be incorrect or perhaps invalid. For example, if the measuring device is attempting to determine the phase difference between a first and second input signal and one of the input signals is missing or the signals are occurring in an improper order, the resultant display would be meaningless. In instances when the displayed information is of a critical nature, it is important to prevent meaningless information from being displayed.

Accordingly, it is a broad object of this invention to display only meaningful information.

In the aforementioned measuring devices and information processing systems it is desirable to turn off the indicator elements while the system is processing the information and to turn on the indicator elements when the system is prepared to display its output. Frequently this is done by placing the indicator elements and the application of the display information thereto under the control of an independent clock source. The period of the clock source then determines when the processed information is presented for display. This is done notwithstanding the possibility that the information being displayed is meaningless due to incorrect or invalid input information.

It is, therefore, a further object of this invention to preclude displaying processed information which results from incorrect or invalid input information.

SUMMARY OF THE INVENTION

In accordance with the present invention, information is displayed on indicator elements when the input signals contain certain characteristics which establish their validity. At all other times, the information is blocked from the indicator elements.

It is a feature of this invention that input signals are determined to be valid when they contain transitions having a predetermined slope sufficiently steep to define signals that are digital in nature.

In accordance with the illustrative embodiment of the invention described herein, two digital signals are compared and a representation of that comparison is gated to a plurality of indicator elements for display thereon. It is a further feature of this invention to enable the gating circuit when a transition of the second digital signal occurs subsequent to a transition of the first digital signal.

DETAILED DESCRIPTION

Figure 1:
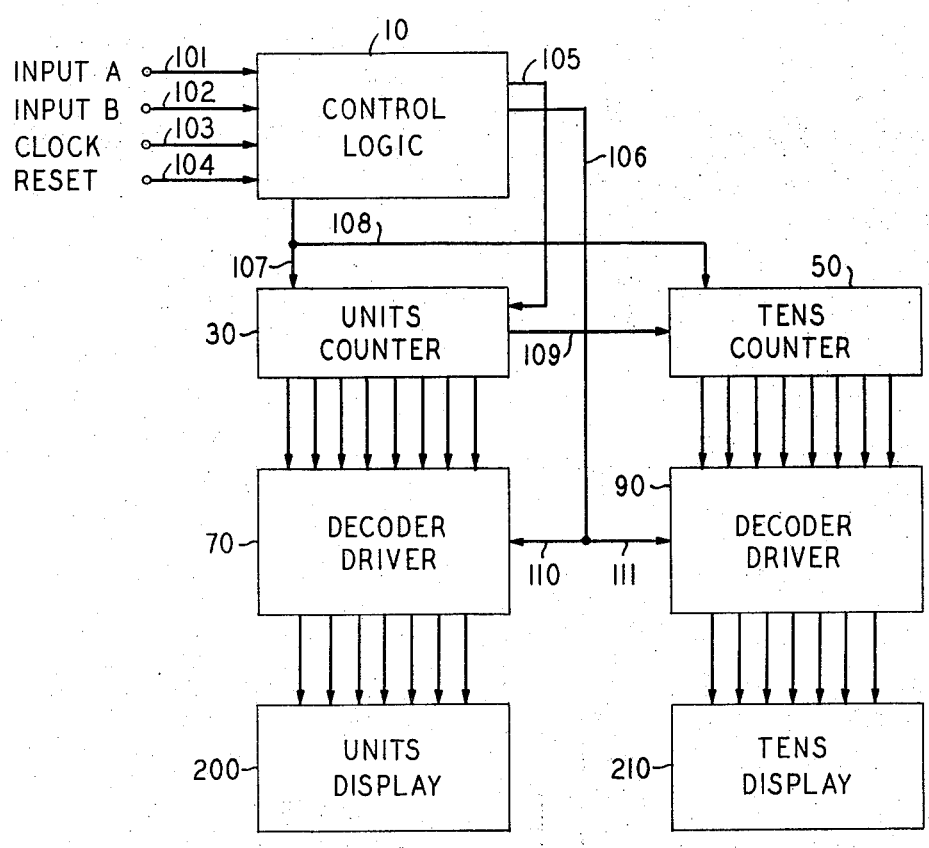
FIG. 1 is a block diagram representation of a measuring device which determines the phase difference between two digital signals and displays a representation of that phase difference on a plurality of indicator elements in accordance with this invention.

Refer now to FIG. 1. Two digital input signals of the same frequency whose phase difference is to be measured are received on input terminals A and B and thereby appear on lead 101 and 102, respectively. Input lead 103 receives a digital clock signal whose frequency is preferably much greater than the frequency of the two input signals on leads 101 and 102. An appropriate ratio is 64:1. Input lead 104 receives a RESET pulse, which initializes the circuitry at periodic intervals.

Control logic 10 responds to the arrival of a digital input signal on lead 101 by directing the clock signal to units counter 30 via lead 105. Units counter 30 and tens counter 50 count the number of clock pulses which occur between the arrival of a digital input signal on lead 101 and the subsequent arrival of a digital input signal on lead 102. The occurrence of the digital input signal on lead 102, in the proper sequence, is recognized by control logic 10, which stops the counters and enables decoder/driver 70 and decoder/driver 90 to decode the count and apply the decoded count to units display 200 and tens display 210. Units display 200 and tens display 210 advantageously comprise a multiplicity of segments forming the numerals 0 to 9, each segment preferably comprising a light emitting diode providing a visual indication in response to energization of an input lead to display 200 and 210.

Assume the circuitry has been initialized in accordance with the RESET pulse operation. In this RESET state, control logic 10 applies a blanking signal to lead 106 and then, via leads 110 and 111, to decoder/driver 70 and decoder/driver 90. This blanking signal disables decoder/driver 70 and decoder/driver 90, thereby blocking the count stored in units counter 30 and tens counter 50 from units display 200 and tens display 210. Following the RESET pulse operation, the circuitry is ready to begin a determination of the phase difference between the two digital signals appearing on leads 101 and 102.

The control logic 10 is designed to detect transitions of the two digital input signals that exceed a predetermined slope. Initially, a transition is detected on input lead 101 by control logic 10. Thereafter, clock pulses arriving on input lead 103 are directed to lead 105, to advance units counter 30. Units counter 30, in turn, advances tens counter 50 via lead 109. Both units counter 30 and tens counter 50 are standard 10-bit shift register ring counters. Counter 30 thus counts the number of clock pulses arriving on input lead 103, and counter 50 counts the tenth pulse output of counter 30 on lead 109 and both counters together provide a units count and a tens count of the number of clock pulses.

When a transition occurs on input lead 102, control logic 10 blocks further clock pulses from appearing on lead 105. Thus, the count stored in units counter 30 and tens counter 50 is equal to the number of clock pulses which occurred between the first transition on input lead 101 and a subsequent transition on input lead 102. As the signals appearing on leads 101 and 102 are of the same frequency and of a digital nature, the count stored in units counter 30 and tens counter 50 is indicative of their phase difference.

The transition on lead 102, together with the prior transition on lead 101, is interpreted by control logic 10 as a valid input sequence. Control logic 10 then enables decoder/driver 70 and decoder/driver 90 by applying an enabling signal on leads 106, 110, and 111. The count stored in units counter 30 and tens counter 50 is thereby decoded by decoder/driver 70 and decoder/driver 90 and the decoded count is then applied to units display 200 and tens display 210. This count remains displayed until another RESET pulse is received on input lead 104. At this time the display is again blanked by the disabling of the drivers and another phase measurement is taken in accordance with the previously detailed method.

Figure 2A:
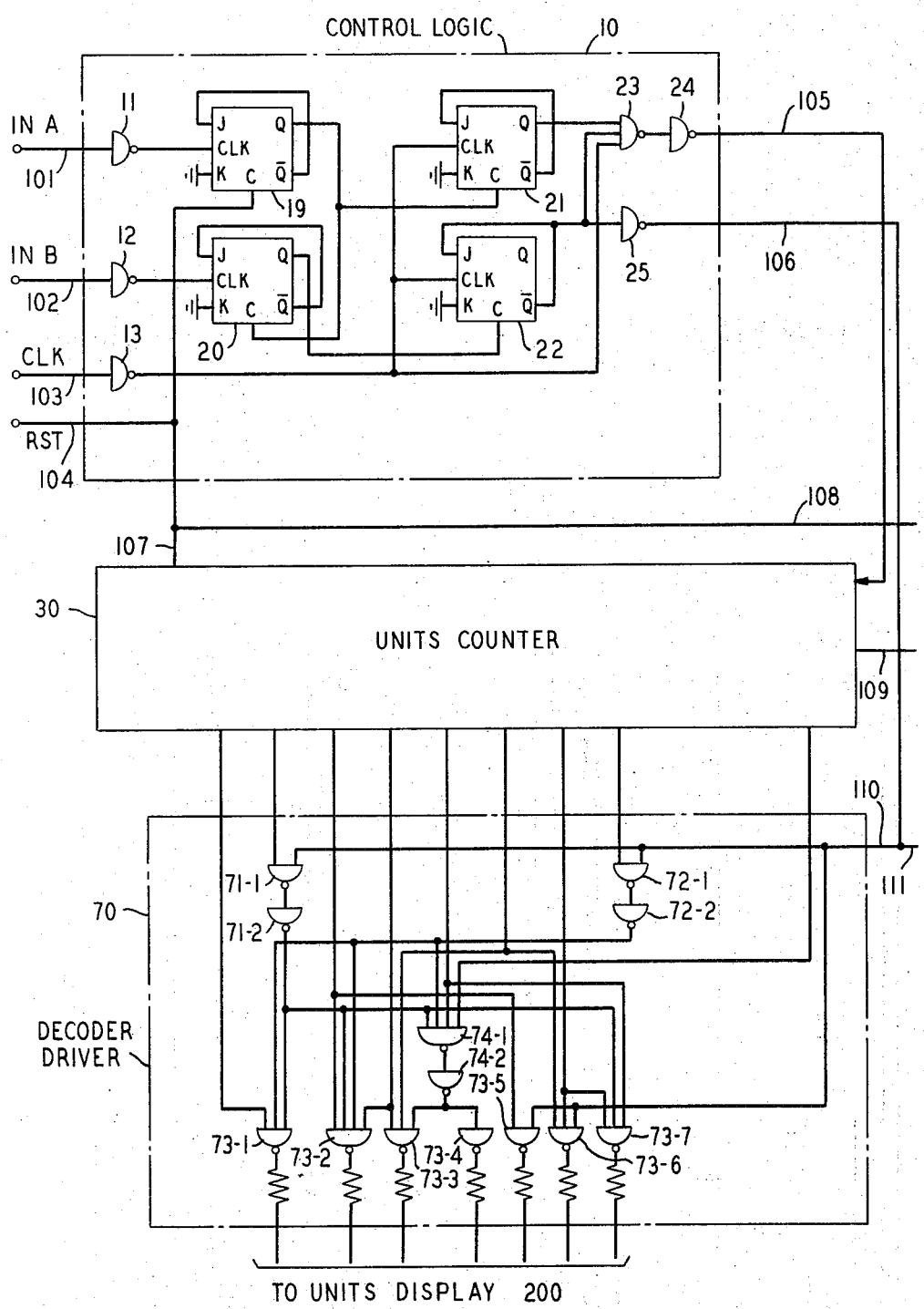
FIGS. 2A and 2B, when arranged side by side, show, in schematic form, the details of circuitry of the measuring device.
Figure 2B:
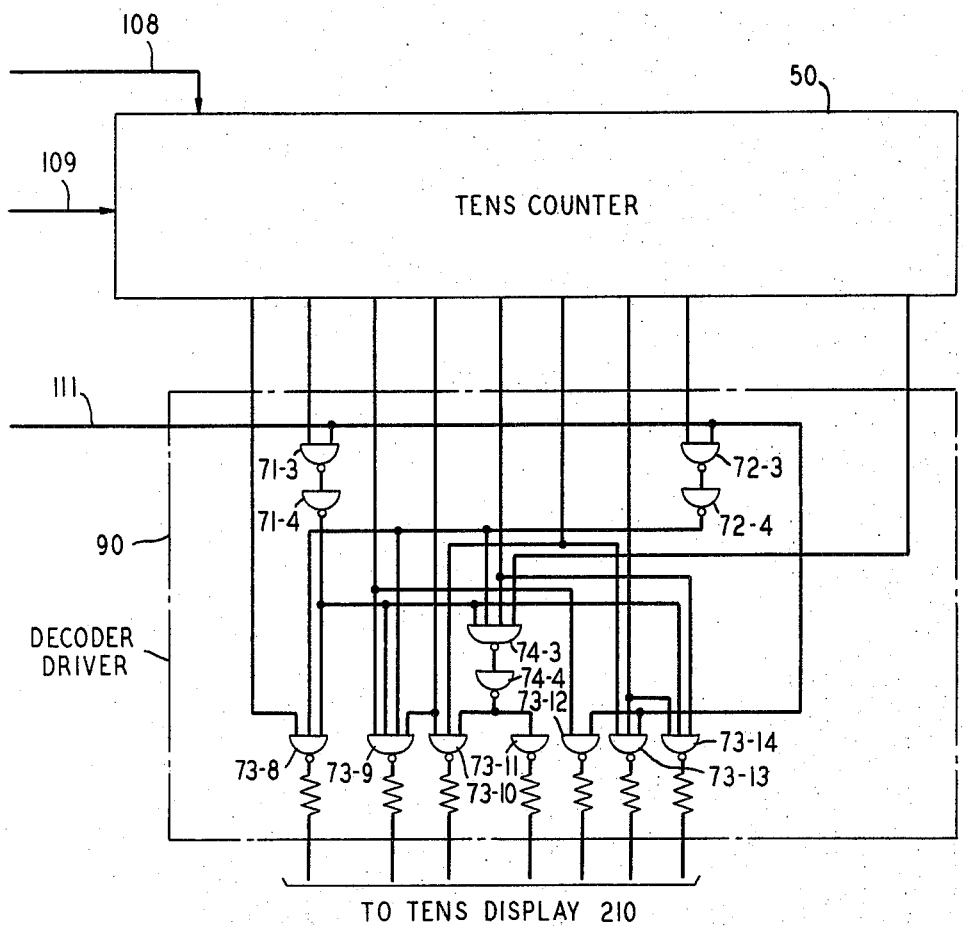

Refer now to FIGS. 2A and 2B. The RESET pulse received on lead 104 has the purpose of initializing the circuitry at periodic intervals. Assume for example that it is desired to determine the phase difference between the two digital input signals every two seconds. Therefore, every two seconds a RESET pulse would be received to prepare the circuitry for a new measurement.

The RESET pulse clears flip-flop 19 and, via leads 107 and 108, sets units counter 30 and tens counter 50 to an initial state. Clearing flip-flop 19 causes its Q output to go low, which clears flip-flop 20 and 21 and flip-flop 21, in turn, disables gate 23. This blocks the clock input signal from units counter 30. The Q output on flip-flop 20 goes low and clears flip-flop 22. The $\overline{Q}$ output of flip-flop 22 is therefore high so that gate 25 applies a low condition to lead 106. The condition of lead 106 controls gates 71(1), 72(1), 73(5) and 73(6) (FIG. 2A) and gates 71(3), 72(3), 73(12) and 73(13) (FIG. 2B) via leads 110 and 111. Gates 71(1), 72(1), 71(3) and 72(3), in turn, control gates 71(2), 72(2), 71(4) and 72(4). These gates, in turn, control gates 74(1) through 74(4), 73(1) through 73(4), 73(7) through 73(11) and 73(14). Therefore, as can be ascertained from FIGS. 2A and 2B, the low condition on lead 106 causes the outputs of gates 73(1) through 73(14) to go high. Gates 73(1) through 73(14) control the individual segments of units display 70 and tens display 90 whereby a high output on any of gates 73(1) through 73(14) turns off a particular display segment. Therefore, lead 106, going low, causes each segment of the displays to be turned off. The circuitry is now prepared to begin a phase measurement.

The two digital input signals appearing on leads 101 and 102 can be described as waveforms which maintain themselves at one constant voltage level $V_1$ for a time $T_1$ and at another constant voltage level $V_2$ ($V_2 < V_1$) for a time $T_2$ and which are repetitive with a period $T = T_1 + T_2$. The transition time from $V_1$ and $V_2$ and from $V_2$ back to $V_1$ must meet specified requirements before the input signals will be detected by control logic 10. The digital signals on leads 101 and 102 are applied via inverters 11 and 12 to the CLOCK inputs of J-K flip-flops 19 and 20. These flip-flops along with flip-flops 21 and 22 are advantageously of the type described on page 6–58 of The Integrated Circuits Catalog for Design Engineers, First Edition, by Texas Instruments Incorporated. As described therein, a positive voltage transition within a predetermined rise time, when applied to the CLOCK input, allows information to be entered via the J-K inputs. A subsequent negative voltage transition within a predetermined fall time, when applied to the CLOCK input, changes the outputs Q and $\overline{Q}$ to conform with the information entered. The characteristics of the flip-flop require the J input to be high and the K input to be low for the flip-flop to be SET when the negative voltage transition is received on the CLOCK input. Similarly, a low level on the C input clamps the flip-flop in the CLEAR state regardless of the CLOCK input, while a high level on the C input allows the flip-flop to change state in the normal manner upon reception of a CLOCK input. In the specific embodiment of the invention described herein, the flip-flops are arranged to respond to CLOCK input transitions from nominally 5 volts to 0.4 volts and, vice versa, with maximum rise time and fall time of 160 nanoseconds and 25 nanoseconds, respectively.

Flip-flop 19 is initially CLEAR, as described above. The first positive transition reaching the CLOCK input of flip-flop 19 from inverter 11, conforming to the specifications previously detailed, applies the high level from the $\overline{Q}$ output into the J input. The subsequent negative transition conforming to the specifications then toggles the flip-flop, causing it to be SET. Flip-flop 19 now remains in this state, notwithstanding the application of additional voltage transitions to the CLOCK input. This occurs because the K input is tied to ground potential; so once flip-flop 19 is SET, it remains in this state until cleared by a subsequent RESET pulse applied to the C input. Flip-flop 19 being SET causes its Q output to go high. This unclamps flip-flops 20 and 21 from the CLEAR condition. The next negative voltage transition from inverter 13 sets flip-flop 21, thereby enabling gate 23 and allowing the clock signal to pass through gates 23 and 24 to units counter 30. The counters now begin to count the clock pulses.

The digital signal from input lead 102 is applied via inverter 12 to flip-flop 20. If this signal conforms to the specifications previously detailed, the first negative transition from inverter 12 sets flip-flop 20. The Q output of flip-flop 20 is now high, which releases flip-flop 22 from the CLEAR condition, allowing it to be set by the next negative clock pulse transition. This causes the $\overline{Q}$ output of flip-flop 22 to go low, thereby disabling gate 23 and blocking further clock pulses from lead 105. When the $\overline{Q}$ output of flip-flop 22 goes low, lead 106 is forced high due to inverter gate 25. This high level on lead 106 enables decoder/driver 70 and decoder/driver 90. The count now stored in units counter 30 and tens counter 50 is equal to the number of clock pulses that occurred between the first negative transition on input lead 101 and the subsequent negative transition on input lead 102. As the signals on leads 101 and 102 are digital signals of the same frequency, the count is indicative of their phase difference. This count is now presented to decoder/driver 70 and decoder/driver 90.

The decoder/drivers are comprised of gates used to decode the stored count and to drive the individual segments of the displays. When lead 106 is high the decoder/drivers accept the stored count and convert it to high and low voltage levels on the outputs of gates 73(1) through 73(14). The stored count is decimal in nature and the gates comprising the decoder/drivers convert it to the appropriate voltage levels, whereby the individual segments of the displays are selectively energized to form the decimal numerals 0 to 9. The display remains energized until the next RESET pulse initializes the circuitry and lead 106 returns to the low state.

The measurement procedure just described occurs when both digital inputs are present and contain valid voltage transitions. If these conditions are not met it indicates that one or both of the inputs are incorrect or invalid. The circuit response to invalid inputs will now be considered.

Assume the circuitry has been initialized in the manner previously detailed. In this state the display is blanked and no information will be displayed until a measurement is completed. Consider the following conditions:

Input A absent

If input A is absent, flip-flop 19 will not be set. Therefore, flip-flops 20 and 21 remain clamped in the CLEAR state and flip-flop 20, in turn, keeps flip-flop 22 clamped in the CLEAR state. In this instance, lead 106 is low and the display remains blanked.

Input B absent

The arrival of input A sets flip-flop 19, which releases flip-flops 20 and 21 from the CLEAR state. The first negative transition on the clock input lead sets flip-flop 21, which allows the clock signal to pass through gates 23 and 24 and the counters begin to count the clock pulses. However, with the absence of input B, flip-flop 20 remains CLEAR and it, in turn, keeps flip-flop 22 CLEAR. Therefore, lead 106 remains low and the incorrect count stored in the counters is never displayed. With the arrival of the next RESET pulse, the circuit reinitializes and is ready to attempt another measurement.

Lack of Valid Voltage Transitions

The two digital input signals must contain voltage transitions meeting the previously detailed specifications. If the transitions are absent or fail to meet the requirements, it indicates that the signals appearing on leads 101 and 102 are invalid. Both flip-flops 19 and 20 require voltage transitions meeting or exceeding the previous requirements before they can be set. Therefore, input signals failing to meet the requirements are ignored and handled in the same manner as are absent signals.

Improper Sequence

From the previous description it is clear that flip-flop 19 must be set before the control logic 10 begins a phase measurement. The circuitry is designed to begin the phase measurement with the first negative transition on lead 101 and end the phase measurement with a subsequent negative transition on lead 102. If the signal transitions fail to arrive in this sequence, no action is taken and the display remains blanked.

Although a specific embodiment of this invention has been shown and described it will be understood that various modifications may be made without departing from the spirit of this invention.

I claim:

1. A circuit for displaying information derived from a first and second input signal on a plurality of display elements, each input signal having transitions between two predetermined amplitude levels, the circuit including:

means for gating the information to the display elements in response to an enabling signal and blocking the information from the display elements in response to a blanking signal, and means normally producing the blanking signal for producing the enabling signal in response to transitions of both the first and second input signals which exceed a predetermined slope.

2. A circuit in accordance with claim 1 wherein the enabling signal producing means includes means exclusively responsive to the occurrence of the second input signal transition after the occurrence of the first input signal transition for operating said producing means.

3. A circuit in accordance with claim 1 wherein the enabling signal producing means comprises a first means operated in response to transitions of the first input signal and second means responsive to the operation of the first means and to subsequent transitions of the second input signal.

4. A circuit in accordance with claim 3 wherein the first means initiates the comparing operation and the second means terminates the comparing operation.

* * * * *

UNITED STATES PATENT OFFICE
CERTIFICATE OF CORRECTION

Patent No. 3,836,903      Dated September 17, 1974

Inventor(s) Thomas R. Lawrence

It is certified that error appears in the above-identified patent and that said Letters Patent are hereby corrected as shown below:

Claim 4:

Column 6, line 43, "comparing" should read --displaying--;

line 44, "comparing" should read --displaying--.

Signed and sealed this 31st day of December 1974.

(SEAL)
Attest:

McCOY M. GIBSON JR.
Attesting Officer

C. MARSHALL DANN
Commissioner of Patents